(12) United States Patent
Leung et al.

(10) Patent No.: US 11,570,091 B2
(45) Date of Patent: Jan. 31, 2023

(54) SERVICE-FUNCTION CHAINING USING EXTENDED SERVICE-FUNCTION CHAIN PROXY FOR SERVICE-FUNCTION OFFLOAD

(71) Applicant: Cisco Technology, Inc., San Jose, CA (US)

(72) Inventors: Kent Leung, Palo Alto, CA (US); Jianxin Wang, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 37 days.

(21) Appl. No.: 17/130,865

(22) Filed: Dec. 22, 2020

(65) Prior Publication Data
US 2021/0111993 A1 Apr. 15, 2021

Related U.S. Application Data

(63) Continuation of application No. 16/578,517, filed on Sep. 23, 2019, now Pat. No. 10,931,571, which is a (Continued)

(51) Int. Cl.
*H04L 45/00* (2022.01)
*H04L 43/026* (2022.01)
(Continued)

(52) U.S. Cl.
CPC .......... *H04L 45/38* (2013.01); *H04L 61/2521* (2013.01); *H04L 67/59* (2022.05); (Continued)

(58) Field of Classification Search
None
See application file for complete search history.

(56) References Cited

U.S. PATENT DOCUMENTS 7,043,494 B1 5/2006 Joshi et al.
9,385,950 B2 7/2016 Quinn et al.
(Continued)

OTHER PUBLICATIONS

S. Kumar, et al., "Service Function Simple Offloads", draft-kumar-sfc-offloads-00, Service Function Chaining, Internet-Draft, Mar. 4, 2015, 15 pages.

(Continued)

*Primary Examiner* — James P Duffy
(74) *Attorney, Agent, or Firm* — Edell, Shapiro & Finnan, LLC

(57) ABSTRACT

An extended service-function chain (SFC) proxy is hosted on a network node and connected to a service path formed by one or more network nodes hosting a chain of service-functions applied to packets traversing the service path. The packets each include a service header having a service path identifier and a service index. A packet of a traffic flow destined for a service-function is received from the service path and sent to the service-function. An indication to offload the traffic flow is received from the service-function. The indication is stored in a flow table having entries each identifying a respective traffic flow. A subsequent packet of the traffic flow is received from the service path. The flow table is searched for the indication to offload the traffic flow. Upon finding the indication, the service-function is bypassed, and the subsequent packet is forwarded along the service path.

20 Claims, 14 Drawing Sheets

Related U.S. Application Data continuation of application No. 15/483,534, filed on Apr. 10, 2017, now Pat. No. 10,462,047.

(51) Int. Cl.
 *H04L 61/2521* (2022.01)
 *H04L 67/59* (2022.01)
 *H04L 47/2483* (2022.01)
 *H04L 45/745* (2022.01)
 *H04L 61/2517* (2022.01)
 *H04L 61/2514* (2022.01)

(52) U.S. Cl.
 CPC .......... *H04L 43/026* (2013.01); *H04L 45/745* (2013.01); *H04L 47/2483* (2013.01); *H04L 61/2514* (2013.01); *H04L 61/2517* (2013.01)

(56) References Cited

U.S. PATENT DOCUMENTS

| | | | |
|---|---|---|---|
| 9,548,919 B2 | 1/2017 | Guichard et al. | |
| 10,931,571 B2* | 2/2021 | Leung | H04L 67/2861 |
| 2014/0362682 A1 | 12/2014 | Guichard et al. | |
| 2015/0138973 A1 | 5/2015 | Kumar et al. | |
| 2015/0215172 A1* | 7/2015 | Kumar | H04L 43/026 |
| | | | 709/223 |
| 2016/0028640 A1* | 1/2016 | Zhang | H04L 67/2804 |
| | | | 370/389 |
| 2016/0099853 A1 | 4/2016 | Nedeltchev et al. | |
| 2016/0366191 A1 | 12/2016 | Patil et al. | |
| 2018/0295053 A1 | 10/2018 | Leung et al. | |
| 2019/0230005 A1* | 7/2019 | Ao | H04L 41/12 |

OTHER PUBLICATIONS

E. Wang, et al., "Service Function Chaining Use Cases for Network Security", draft-wang-sfc-ns-use-cases-00, Service Function Chaining, Internet-Draft, Sep. 24, 2015, 22 pages.

J. Halpern, et al., "Service Function Chaining (SFC) Architecture", Internet Engineering Task Force (IETF), ISSN: 2070-1721, Oct. 2015, 32 pages.

* cited by examiner

SERVICE-FUNCTION CHAINING USING EXTENDED SERVICE-FUNCTION CHAIN PROXY FOR SERVICE-FUNCTION OFFLOAD

CROSS-REFERENCE TO RELATED APPLICATIONS

This application is a continuation of U.S. patent application Ser. No. 16/578,517, filed Sep. 23, 2019, which is a continuation of U.S. patent application Ser. No. 15/483,534, filed Apr. 10, 2017, which issued as U.S. Pat. No. 10,462,047, Oct. 29, 2019, the entireties of which are incorporated herein by reference.

TECHNICAL FIELD

The present disclosure relates to service-function chains.

BACKGROUND

Network services are widely deployed in networks. Such network services may be defined as service-functions that form a "service-function chain." A service-function chain is a sequence of service-functions hosted on a set of service nodes and that are applied to data packets traversing the service-functions. Internet Engineering Task Force (IETF) Request for Comments (RFC) 7665 defines a service-function chaining architecture; however, RFC 7665 does not support a variety of service-function chain deployment or use cases. Such unsupported use cases include a receive-only service-function, traffic flow offloading by a service-function, load balancing across a cluster of stateful service-function instances, a service-function that performs network address translation (NAT) and/or port address translation (PAT), and a service-function that performs service path reclassification.

DESCRIPTION OF EXAMPLE EMBODIMENTS

Overview

Figure 1:
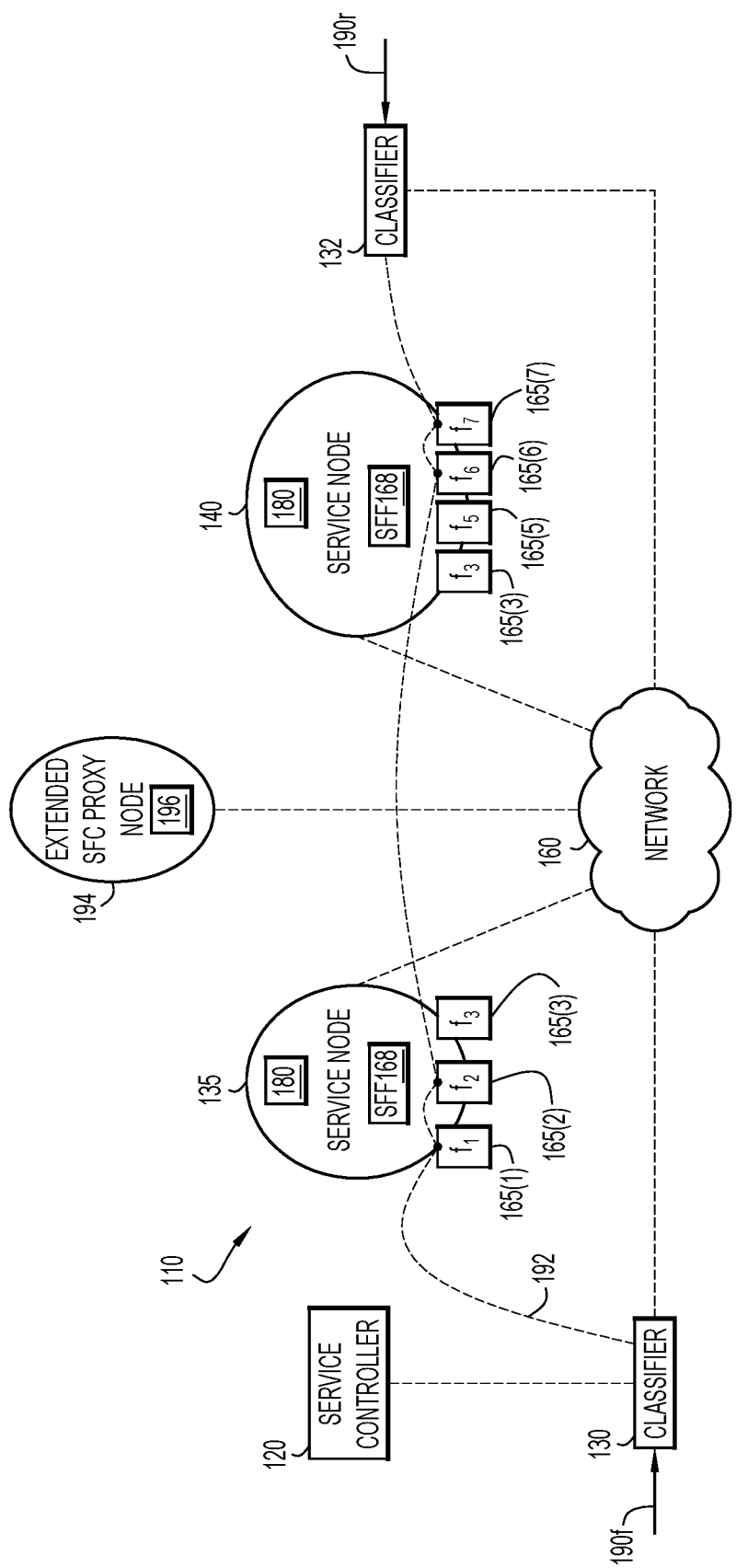
FIG. 1 is a block diagram of an example computing environment configured to implement service-function chaining using an extended service-function chain (SFC) proxy, in accordance to an example embodiment.

An extended service-function chain (SFC) proxy supports service-function chaining deployments including one or more of a receive-only service-function, an offloading service-function, a stateful service-function with load balancing across multiple instances of the service-function, a network address translation (NAT) service-function, and a reclassification service-function.

In an offloading embodiment in which the extended service-function chain (SFC) proxy supports the offloading service-function, the extended SFC proxy is hosted on a network node and connected to a service path formed by one or more network nodes hosting a chain of service-functions applied to packets traversing the service path. The packets each include a service header having a service path identifier and a service index. A packet of a traffic flow destined for a service-function among the service-functions is received from the service path. The packet is sent to the service-function. An indication to offload the traffic flow is received from the service-function. The indication is stored in a flow table having entries each identifying a respective traffic flow handled by the extended SFC proxy. A subsequent packet of the traffic flow is received from the service path. The flow table is searched for the indication to offload the traffic flow. Upon finding the indication, the service-function is bypassed, and the subsequent packet is forwarded along the service path.

Example Embodiments

RFC 7665 defines a service-function chaining architecture. Service-function chaining involves intercepting traffic (i.e., packets) and steering the traffic through a series or chain of service-functions (SFs) applied to the traffic. A service-function chain (SFC) is an ordered sequence of service-functions (e.g., firewall, server load balancer, NAT, and the like) formed by a set of service nodes (i.e., physical or virtual devices) that host the service-functions. The SFC is defined by a service controller in terms of the service-functions to be applied to traffic. The traffic is intercepted through the use of classifier functions at nodes (i.e., switches, routers, etc.) that serve as end nodes to the SFC. The node that executes the classifier function may be referred to as a "classifier" or "classifier node." In general, the traffic is steered from the classifier through the service-functions using one or more Layer 2 (L2)/Layer 3 (L3)

service overlays in the network. The L2/L3 service layer may be implemented in service-function forwarding logic (also referred to as a "service-function forwarder" (SFF)) hosted on the service nodes together with one or more service-functions, or on separate nodes that do not host service-functions.

The classifier encapsulates traffic with a network service header (also referred to as a "service function header," or more simply as a "service header") to assist with forwarding of the traffic along the SFC. The service header enables the carrying of service metadata in addition to the original data/payload. The service header includes information specifically formatted for consumption by each service-function-chain aware service-function that is configured to interpret and handle the service header. The information in the service header may include, for example: an application identifier (ID); flow or service path ID (SPID) identifying a service path; a service index (SI) normally set to an initial value at the classifier and then decremented by a service-function-chain aware service-function; a client or user ID; network classification information used for deriving targeted service policies and profiles; and additional metadata that can be passed to the service-functions further down the service-path. Service-functions benefit from the information and metadata derived both from the network as well as the service-functions that form a given SFC. The information and metadata can also be passed between network nodes and be used, for example, to determine forwarding state at the end of a service chain.

The service-function chaining architecture defined in RFC 7665 does not support any of the following SFC deployment/use cases:
  a. A receive-only (RO) service-function (e.g., an intrusion detection service (IDS). The receive-only service-function consumes a packet received from the SFF. This prevents the packet from traversing necessary remaining service hops in the service path.
  b. Flow offload from a service-function. When a service-function indicates flow offload to the SFF, the SFF needs to bypass the service-function and forward packets to a next service-function in the service path. This requires that the service index be decremented to lookup the next service-function. Decrementing the service index is not a function performed by the SFF.
  c. Load balancing across stateful service-function instances at a service hop on the service path. When there is a cluster of stateless service-function instances at a service hop, the SFF may be able to load balance the traffic flows across the instances in using a stateless technique. However, when the service-function is stateful, a state needs to be maintained to associate load balanced traffic flows to the service-function instances. Such stateful load balancing is not a function performed by the SFF.
  d. A service-function that performs NAT and/or PAT operations. A service-function that performs NAT operations changes L3/L4 packet headers (e.g., IP packet headers). Thus, the flow state on the classifier connected to the end of the service path needs to be updated with the new L3/L4 headers so that reverse traffic is classified, and can therefore flow correctly.
  e. A service-function that performs service path reclassification. A service-function that performs service path reclassification changes the service header, including the SPID and SI. Thus, the flow state on the classifier connected to the end of the service path needs to be updated with the new service path ID and service index so that the subsequent packets on both forward and reverse traffic are classified correctly.

RFC 7665 defines a conventional service-function proxy only for handling a special service-function that is SFC unaware, which is unable to interpret and handle the service header encapsulating traffic in the SFC. According to RFC 7665, the SFC proxy adds or removes the service header received from or sent to the SFC unaware service-function, i.e., on behalf of the SFC unaware service-function. The SFC proxy and the SFC unaware service-function together form a "regular" or "normal" service-function that is able to participate in the SFC. The capability of the SFC proxy is limited to the aforementioned operations.

Accordingly, techniques presented herein introduce an extended SFC proxy (also referred to as simply a "proxy") that extends the functionality/capabilities of the conventional SFC proxy, beyond the limited functions of removal and insertion of the service header, so as to handle SFC deployment/use cases (a)-(e) listed above. Thus, in the support of use cases (a)-(e) in the SFC, the extended service-function proxy:
  a. In a receive-only embodiment, supports a receive-only service-function in the SFC. In support of the receive-only service-function, the extended SFC proxy performs packet replication, among other functions.
  b. In a flow offloading embodiment, supports flow offload for a service-function. In support of the flow offload, the extended SFC proxy provides a "cut-through" or bypass path for offloaded flows.
  c. In a load balancing embodiment, load balances among a cluster of stateful service-function instances.
  d. In a NAT embodiment, supports a service-function that performs NAT/PAT.
  e. In a reclassification embodiment, supports a service-function that performs service path reclassification.

The extended SFC proxy appears as a logical service-function (associated with service-functions in the service-function chain) from the perspective of the SFF, and appears as a logical SFF from the perspective of the service-function.

In terms of functionality, the extended SFC Proxy:
  a. Serves the service-function and SFF in the SFC, but does not directly apply a service to the user traffic as done by the service-functions in the SFC.
  b. Extends the operations of the conventional SFC proxy serving service-functions that are not SFC aware (i.e., are not service header aware).
  c. Facilitates the interaction between SFC-aware service-functions and service-function forwarder in compliance with the SFC architecture.
  d. Is "invisible" to the SFC from the perspective of a user defining functionality to be provided by service-functions.
  e. Is visible as a logical service-function in a service hop in the service path from the perspective of the SFF.
  f. Is visible as a logical SFF from the perspective of the service-function.

The extended SFC proxy differs from a service-function in that it:
  a. Does not decrement the SI on egress when sending a packet to the associated service-function or forwarding a packet from the associated-service-function to the SFF (i.e. it provides an indirect path to the SFF). The extended SFC proxy only decrements the service index when forwarding a packet from ingress to egress (i.e. along a direct path to the SFF, which is similar to a service-function operation in this case).

b. Is not part of a SFC.

c. Is part of a service path by being combined with the associated service-function.

The extended SFC Proxy differs from the conventional SFC proxy in that it:

a. Serves an associated service-function which is service-header aware (and thus SFC aware).

b. Selectively decrements or does not decrement the SI, depending on different cases in which the extended SFC proxy is used.

c. Does not remove or insert SFC encapsulation (i.e., the service header) for the associated service-function as is done by the conventional SFC proxy, i.e., performs its functions without removing or inserting the service header.

d. Provides additional functions above those provided by the conventional SFC proxy, as described above and in further detail below.

Reference is now made to FIG. 1 for a description of an example computing network 110 in which the techniques presented herein may be employed. The computing network 110 comprises a service controller 120, classifier nodes (i.e., "classifiers") 130 and 132, and multiple service nodes 135 and 140. Classifier nodes 130 and 132 are in communication with the service controller 120 and a network 160. The service nodes 135 and 140 are also connected to the network 160. The service nodes 135 and 140 are sometimes referred to herein as network nodes, and the classifier nodes 130 and 132 may also be referred to as head-end nodes.

The service nodes 135 and 140 each host/support one or more service-functions for application to the payload of traffic passing through the respective service node. More specifically, service node 135 hosts service-functions 165(1) (service-function $f_1$), 165(2) (service-function $f_2$), and 165(3) (service-function $f_3$), while service node 140 hosts service-functions 165(3) (service-function $f_3$), 165(5) (service-function $f_5$), 165(6) (service-function $f_6$), and 165(7) (service-function $f_7$). Service-functions may appear in multiple instances on different service nodes or on the same service node. For example, service-function $f_3$ is hosted on each of the service nodes 135 and 140.

Service nodes 135 and 140 also host an SFF 168 configured to receive traffic from and send traffic to the service-functions forming a chain of service-functions in order to forward the traffic along a specified service path implementing a SFC. SFF 168 forwards the traffic based on information in traffic packets, including L2/L3/L4 information in network packet headers and SPIDs and SIs in service headers encapsulating the packets, for example. The service nodes 135 and 140 also host advertisement logic 180. In operation, the advertisement logic 180 at each of the service nodes 135 and 140 is configured to generate an advertisement or notification that indicates the service-functions that the respective service node hosts (i.e., each service node exposes its service-functions to the service controller).

The service controller 120 is configured to define one or more SFCs for selection by each of classifiers 130 and 132. The selection of the location where the service-functions are available is performed at the classifiers 130 and 132.

Each of classifiers 130 and 132 is configured to dynamically select instances of service-functions that may form part of a SFC based on classification rules as well as various conditions such as load, resources, etc. Due to the advertisements from service nodes 135 and 140, the classifiers 130 and 132 are aware of service-functions hosted on the service nodes 135 and 140 and can map the SFCs to instances of service-functions.

In the example of FIG. 1, service controller 120 defines a service-function chain $SFC_1=f_2 \rightarrow f_6 \rightarrow f_7$ that is available for selection at classifiers 130 and 132. In one example, the SFCs may be constructed initially by specifying a series of service-function classes (types) (e.g., firewall, receive-only, load balancer, NAT, path reclassifier, and deep packet inspection). For example, the service controller 120 may obtain (via an interface, from memory, etc.) an ordered list of service types. The service controller 120 may then use class/type definitions, the obtained list, and the advertised capabilities of the service nodes, to create a SFC (i.e., a chain in terms of service-functions).

Classifiers 130 and 132 intercept forward traffic 190$f$ and reverse traffic 190$r$, respectively, for steering through a SFC defined by service controller 120. Using information (e.g., rules, policies, etc.) provided by service controller 120, each of classifiers 130 and 132 determines that traffic 190$f$, 190$r$ should be steered through a service-function chain $SFC_1$. More specifically, classifiers 130 and 132 each map the selected service-functions (i.e., the service-functions forming the selected service-function chain $SFC_1$) to actual service nodes. This mapping is designed to select the instances of the service-functions that will be applied as part of the SFC (i.e., which instances of service-functions will actually be used to service the particular traffic 190$f$ and 190$r$).

A service path implementing service-function chain $SFC_1$ is shown in FIG. 1 by broken-line 192. The classifier 130 sends forward traffic 190$f$ along the path 100 in a forward direction with the assistance of one or more L2/L3/L4 service overlays in the network implemented via SFFs 168. In other words, a service header is appended to the traffic 190$f$ for forwarding through the traffic through the service-function chain and the service header enables the carrying of service metadata in addition to the original data/payload. Similarly, classifier 132 sends reverse traffic 190$r$ along the path 100 in a reverse direction using the L2/L3/L4 service overlays in the network.

In certain circumstances, a service-function (e.g., a NAT service-function) may change a flow specification or "flow tuple" (e.g., the 5-tuple comprises the source IP address, destination IP address, source port number, destination port number and the protocol in use) of processed packets. That is, traffic may be received at a NAT service-function with an original 5 tuple, but, after processing at the NAT service-function, the traffic will include a new/different 5 tuple. When the flow specification of traffic is changed, the traffic may be processed by different service-functions than those identified in the initial SFC.

In other circumstances, a service-function (e.g., a reclassifier service-function) may reclassify a flow by changing the service header encapsulating the flow. That is, traffic may arrive at a reclassifier service-function with an original service header including an original SPID and SI tuple, but, after processing at the reclassifier service-function, the traffic will include a new service header including a new/different SPID and SI tuple. When the flow specification of traffic is changed, the traffic may need to be processed by different service-functions than those identified in the initial SFC. Service-functions that are capable of changing the flow specification of traffic and/or classification (i.e., service header) encapsulating traffic are referred to as "modifying" service-functions. For example, the NAT service-function and the reclassifier service-function are both modifying service-functions.

In accordance with techniques presented herein, computing network 110 includes an extended SFC proxy node 194 connected to/in service path 192 and configured to communicate with network 160. Proxy node 194 hosts logic to implement an extended SFC proxy configured to handle SFC deployment/use cases (a)-(e) listed above, in addition to the conventional SFC proxy operations. In the example of FIG. 1, extended SFC proxy 196 is hosted on its own node. It is understood, however, extended SFC proxy 196 may share a service node with SFF 168 and one or more of service-functions 165. Also, extended SFC proxy 196 may be connected between different ones of service-functions 165 than those shown in FIG. 1, depending on which of the service-function need the support of the extended SFC proxy.

Use cases/embodiments (a)-(e) employing extended SFC proxy 196 are now described in detail in connection with FIGS. 2-11.

Figure 2:
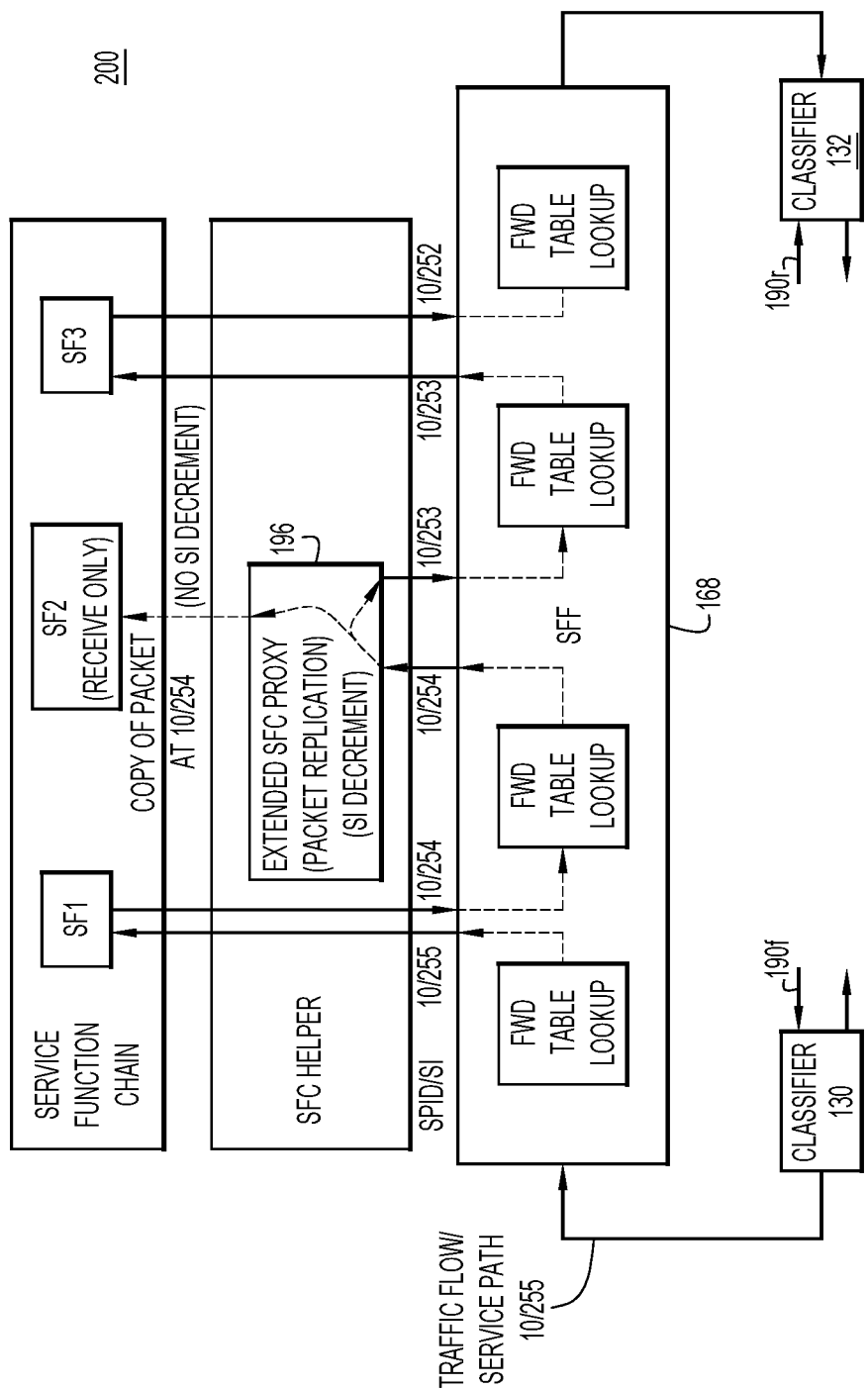
FIG. 2 is an illustration of a receive-only embodiment of service-function chaining using the extended SFC proxy, in accordance to an example embodiment.

With reference to FIG. 2, there is an illustration of a layered architecture 200 for service-function chaining for the receive-only embodiment (a), in which extended SFC proxy 196 supports receive-only service-functions. Layered architecture 200 represents a service-function chaining functional overlay for computer network 110, including (i) a service-function chain of sequentially applied service-functions SF1, SF2, and SF3 (e.g., any three of service-functions 165 from FIG. 1) occupying a top layer, in which service-function SF2 represents a receive-only service-function, (ii) SFF 168 occupying a bottom layer, and (iii) extended SFC proxy 196 occupying a middle or "helper" layer between the service-function chain and the SFF.

In operation, classifier 130 encapsulates traffic (i.e., packets) 190ƒ with a service header including SPID=10 and SI=255, represented as "SPID/SI 10/255" in FIG. 2. The SPID and the SI are collectively referred to as a "classification tuple" or a "service path tuple." The traffic, once encapsulated, flows along a serpentine service path (depicted as sequential arrows in FIG. 2) through SFF 168 and service-functions SF1-SF3 in sequence.

SFF 168 includes a series of forwarding tables (each labeled "FWD Table Lookup" in FIG. 1) that determine and steer the traffic toward next service hops (i.e., service-functions) along the service path in accordance with the encapsulation on, and flow tuples in, the traffic. FIG. 2 shows "forward traffic," i.e., traffic forwarded along the service path in a forward direction (i.e., from left-to-right in FIG. 2); however, it is understood that the service path also supports reverse traffic based on the classification tuples and flow tuples in the traffic.

Extended SFC proxy 196, connected in the service path between SFF 168 and receive-only service-function SF2, serves all service-functions requiring receive-only support at a service hop. The service path depicted in FIG. 3 implements the SFC defined as: SF1→SF2 (via extended SFC proxy)→subsequent SFs.

Figure 3:
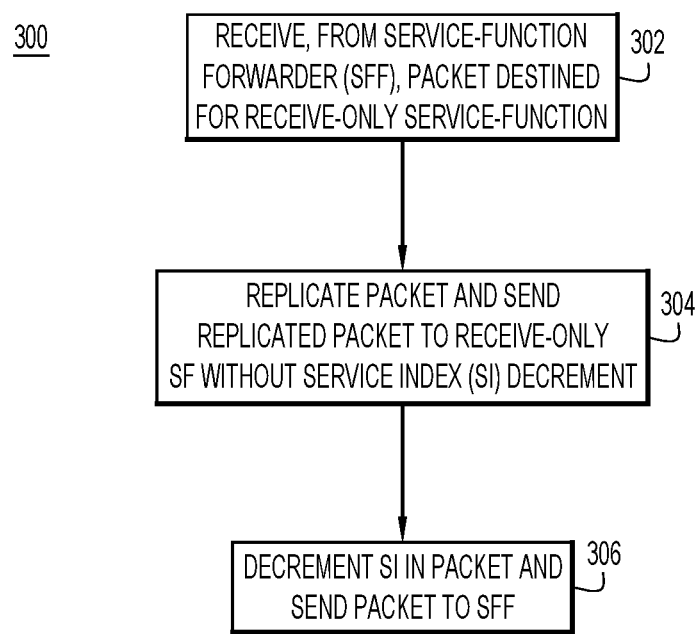
FIG. 3 is a flowchart of operations performed by the extended SFC proxy in the receive-only embodiment, in accordance to an example embodiment.

Operations performed by SFC proxy 196 in the receive-only embodiment are now described with continued reference to FIGS. 1 and 2, and also with reference to FIG. 3, which shows a flowchart 300 of the operations.

At 302, extended SFC proxy 196 receives from SFF 168 a packet in a forward traffic flow intended for receive-only service-function SF2.

At 304, extended SFC proxy 196 replicates the packet and sends the replicated packet to receive-only service-function SF2 without decrementing the service index in the packet. Receive-only service-function SF2 consumes the packet.

At 306, extended SFC proxy 196 decrements the service index in the packet, and sends to SFF 168 the packet with the decremented service index, for forwarding to the next service-function.

A summary of operations performed by extended SFC proxy 196 in method 300 include packet replication, packet forwarding to receive-only service-function SF2 without SI decrement, and packet forwarding to SFF 168 with SI decrement for forwarding to next SF.

Figure 4:
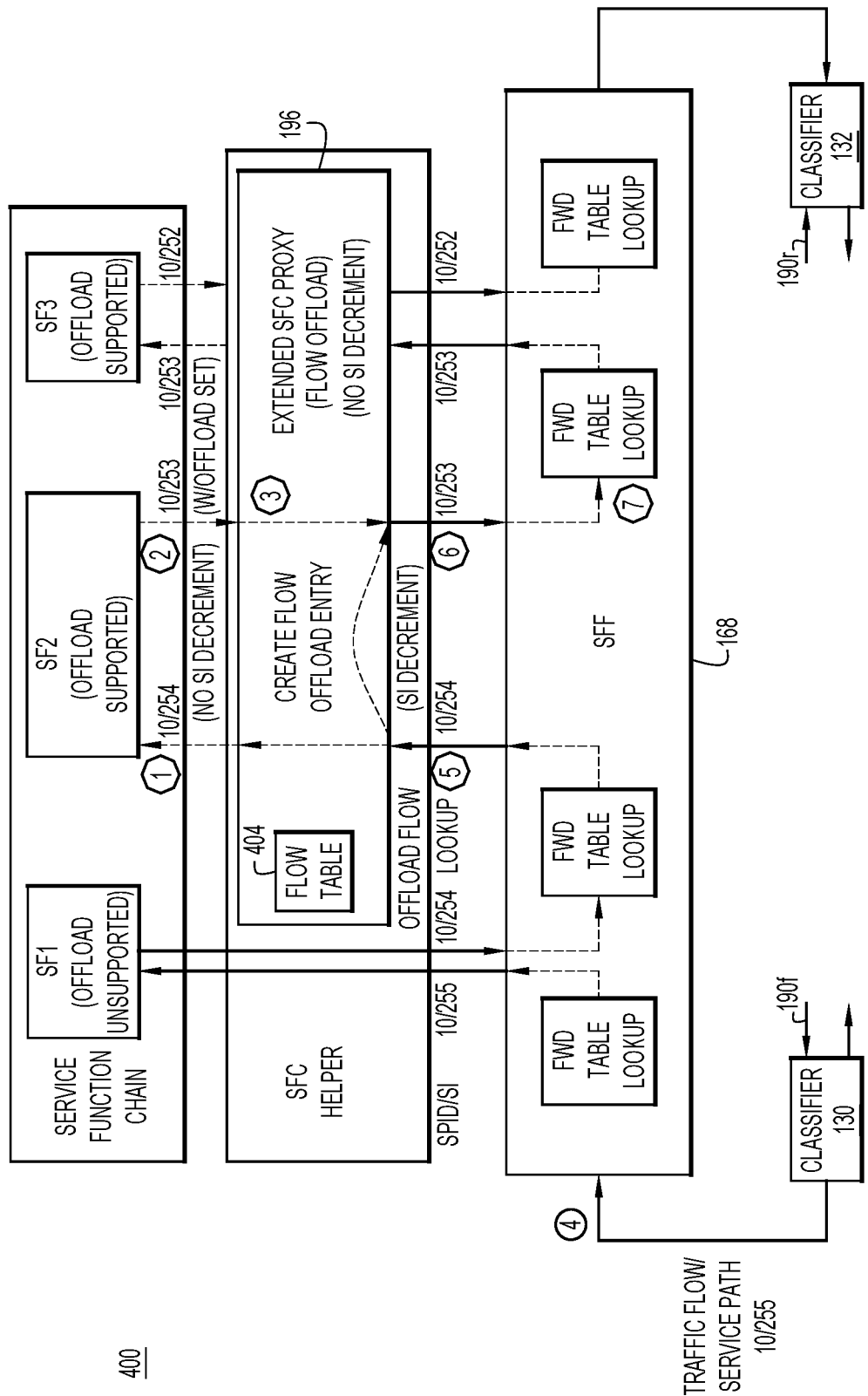
FIG. 4 is an illustration of service-function chaining using the extended SFC proxy to support an offloading embodiment, in accordance to an example embodiment.

With reference to FIG. 4, there is an illustration of a layered architecture 400 for service-function chaining for the offloading embodiment (b), in which extended SFC proxy 196 supports traffic offloading at service-function SF2. Extended SFC proxy 196, connected between SFF 168 and offloading service-function SF2, serves all service-functions that support traffic offloading at a service hop. The service path implements the service-function chain defined as: SF1→SF2 (via extended SFC proxy)→SF3 (via extended SFC proxy).

Operations performed in the offloading embodiment assume extended SFC proxy 196 maintains a flow table 404 having entries each storing a respective flow tuple, copied from a network protocol header of a packet in a flow, identifying the flow handled by the extended SFC proxy. Each time extended SFC proxy 196 recognizes a new flow, the extended SFC proxy creates a new entry, e.g., a flow tuple, in the flow table for that new flow.

Figure 5:
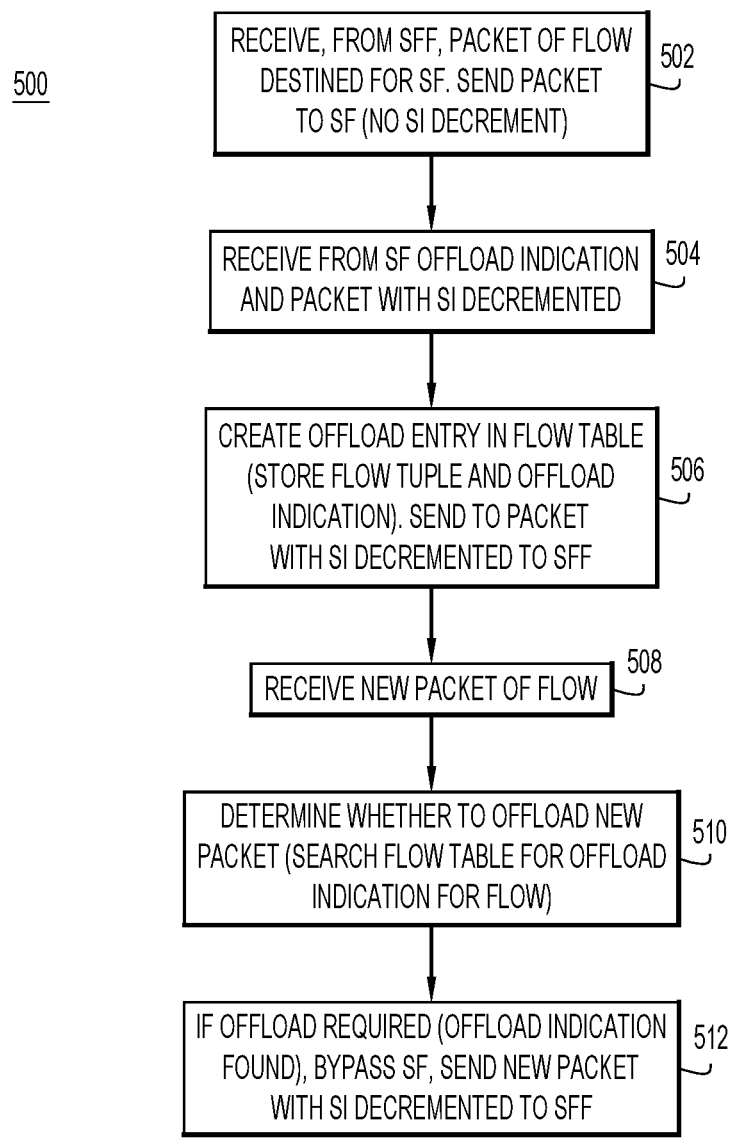
FIG. 5 is a flowchart of operations performed by the extended SFC proxy in the offloading embodiment, in accordance to an example embodiment.

Operations performed by SFC proxy 196 in the offload embodiment are now described with continued reference to FIGS. 1 and 4 (in which various operations/transactions are labeled with encircled numerals "1"-"5"), and also with reference to FIG. 5, which shows a flowchart 500 of the operations.

At 502 (operation "1" in FIG. 4), extended SFC proxy 196 receives from SFF 168 a packet of a flow (identified by the flow tuple in the packet header), and sends the packet to service-function SF2 without decrementing the service index in the packet.

At 504 (operation "2" in FIG. 4), service-function SF2 makes a decision to offload flow and sends to extended SFC proxy 196 (i) a message including an offload indication, and (ii) the (processed) packet with the service index decremented.

At 506 (operation "3" in FIG. 4), upon receiving the message and the packet from service-function SF2, extended SFC proxy 196 creates an offload flow entry in flow table 404, e.g., stores the offload indication in the flow table alongside the flow tuple identifying the flow. Extended SFC proxy 196 sends the packet, without decrementing the service index, to SFF 168 for forwarding of the packet along the service path.

At 508 (operations "4" and "5" in FIG. 4), classifier 130 injects a new packet of the flow into the service path in the forward direction, and extended SFC proxy 196 receives the new packet from SFF 168.

At 510, upon receiving the new packet of the flow, extended SFC proxy 196 determines whether to offload the flow. To do this, extended SFC proxy 196 searches flow table 404 for an offload indication associated with the flow. For example, extended SFC proxy 196 uses the flow tuple in the header of the new packet as an index into flow table 404 to locate the entry for the flow, and examines the located entry for the presence of an offload indication. In this case, the indicator is there, and extended SFC proxy 196 determines that the flow needs to be offloaded.

At 512 (operation "6" in FIG. 4), as a result of determining to offload the flow, extended SFC proxy 196 bypasses service-function SF2, decrements the service index in the new packet, and sends the new packet with the decremented index to SFF 168 for forwarding of the packet along the service path (operation "7" in FIG. 4).

A summary of operations performed by extended SFC proxy 196 in method 500 includes offload flow table management, handling of an offload indication from offloading service-function SF2, packet forwarding to and from the offloading service-function (no SI decrement), and packet offloaded to the next service-function (with SI decrement).

Figure 6:
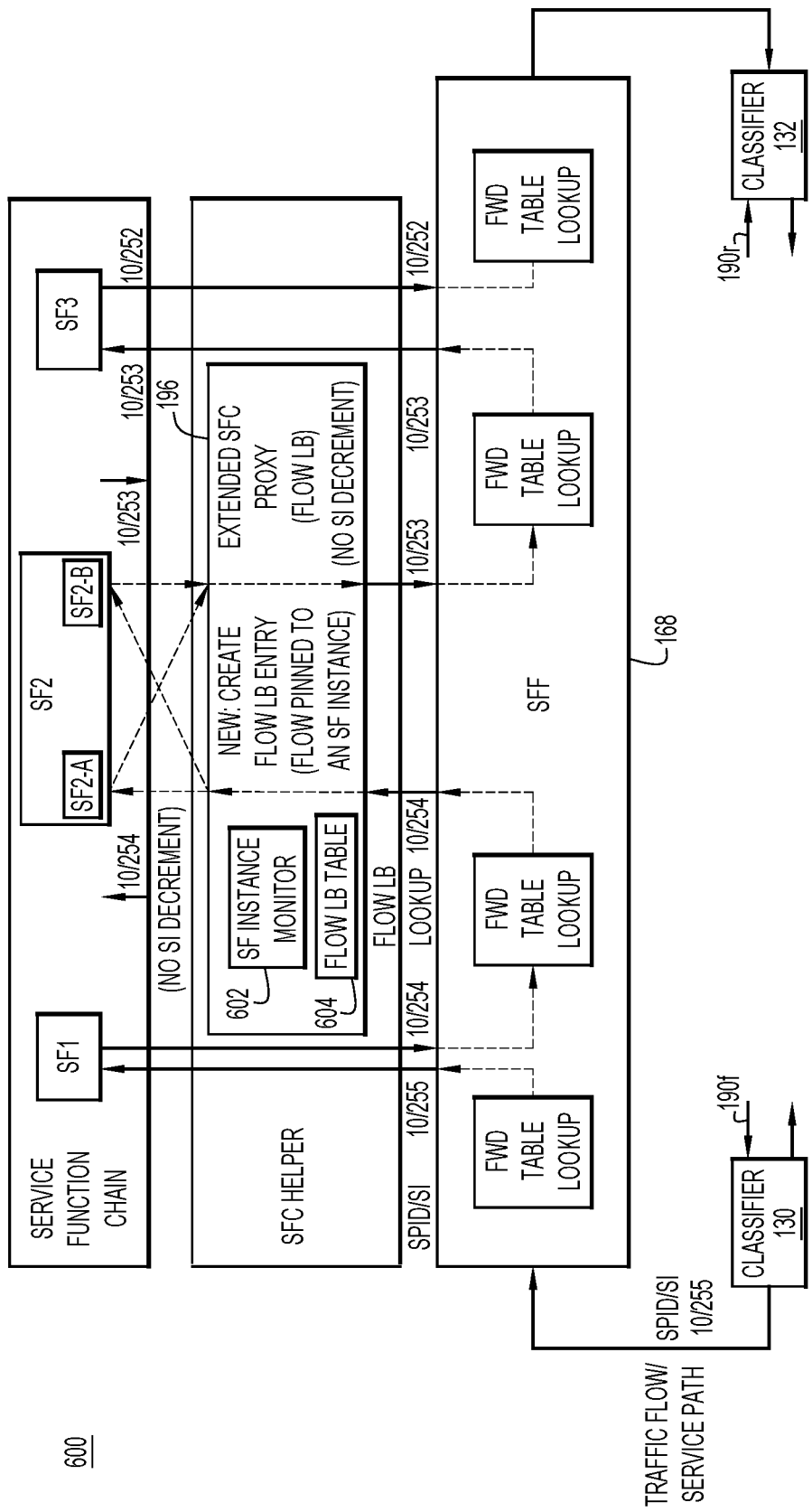
FIG. 6 is an illustration of service-function chaining using the extended SFC proxy to support a load balancing embodiment, in accordance to an example embodiment.

With reference to FIG. 6, there is an illustration of a layered architecture 600 for service-function chaining for the load balancing embodiment (c), in which extended SFC proxy 196 supports load balancing at a service-function SF2 including multiple (i.e., a cluster of) stateful service-function instances SF2-A and SF2-B, across which load balancing may be performed. Extended SFC proxy 196, connected between SFF 168 and service-function SF2, serves all service-functions that support load balancing at a service hop. In the load balancing embodiment, the service path implements the service-function chain defined as: SF1→SF2 (via extended SFC proxy)→SF3.

Extended SFC proxy 196 hosts a service-function instance monitor 602 configured to select one of service-function instances SF2-A or SF2-B to serve a given flow for purposes of load balancing based on a load balancing criterion. Extended SFC proxy 196 also maintains a flow load balancing (LB) table 604 similar to flow table 404. Flow LB table 604 has entries each including a respective flow tuple identifying a flow handled by the extended SFC proxy. Each entry also includes an associated LB indicator to indicate which service-function instance was selected to serves the flow identified in the entry.

Figure 7:
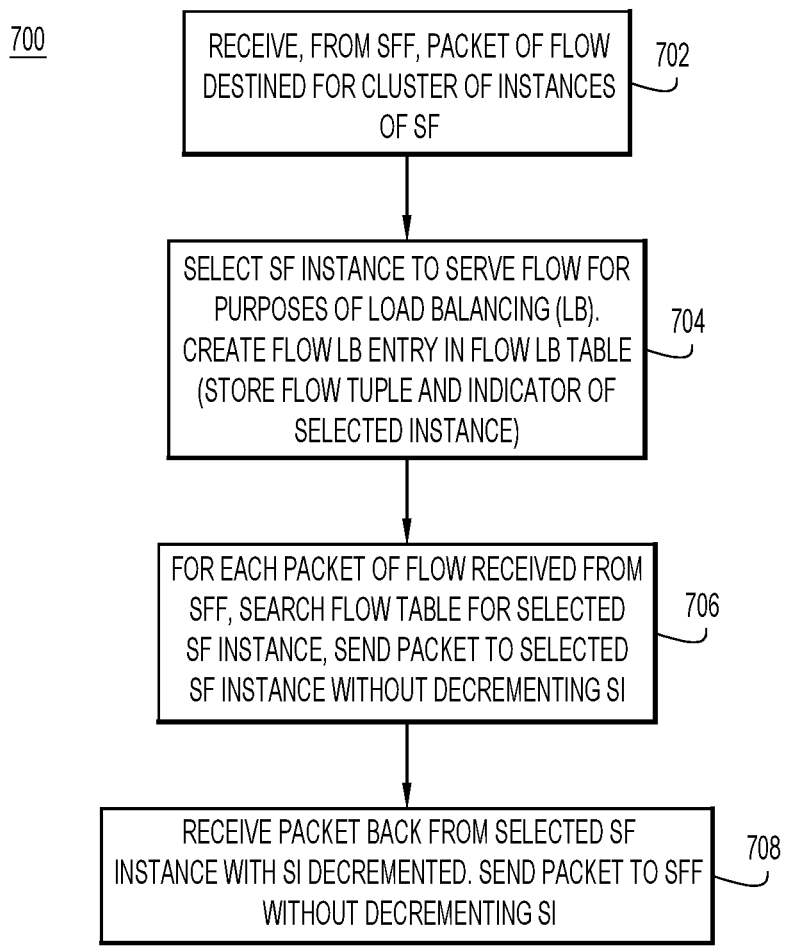
FIG. 7 is a flowchart of operations performed by the extended SFC proxy in the load balancing embodiment, in accordance to an example embodiment.

Operations performed by SFC proxy 196 in the load balancing embodiment are now described with continued reference to FIGS. 1 and 6, and also with reference to FIG. 7, which shows a flowchart 700 of the operations.

At 702, extended SFC proxy 196 receives from SFF 168 a packet of a flow.

At 704, extended SFC proxy 196 load balances across the service-function instances SF2-A and SF2-B, e.g., monitor 602 selects one of the service-function instances to serve the flow based on the load balancing criterion. In response to the selection, extended SFC proxy 196 creates a new flow LB entry in flow LB table 604 for the flow. The flow LB entry identifies the flow (e.g., includes a flow tuple for the flow) and also includes an indicator of the selected instance to serve the flow, thus causing the flow to be "pinned" to the selected service-function instance.

At 706, for each packet in the flow received from SFF 168 (including the one received at (702)), extended SFC Proxy 196 searches the flow LB table (i.e., does flow LB lookup) to determine to which service-function instance to send the packet, i.e., which service-function was selected to serve the flow for purposes of load balancing. Extended SFC proxy 196 sends the packet, without decrementing the packet, to the selected service-function instance found in the search of the flow LB table.

At 708, when extended SFC proxy 196 receives the (processed) packet back from the selected service-function instance with a decremented service index, the extended SFC proxy sends to SFF 168 the packet without decrementing the service index, for forwarding of the packet along the service path.

A summary of operations performed by extended SFC proxy 196 in method 700 includes service-function instance load balancing, service-function instance health and load monitoring, packet forwarding to a selected service-function instance with no SI decrement, and packet return to SFF 168 with no SI decrement.

Figure 8:
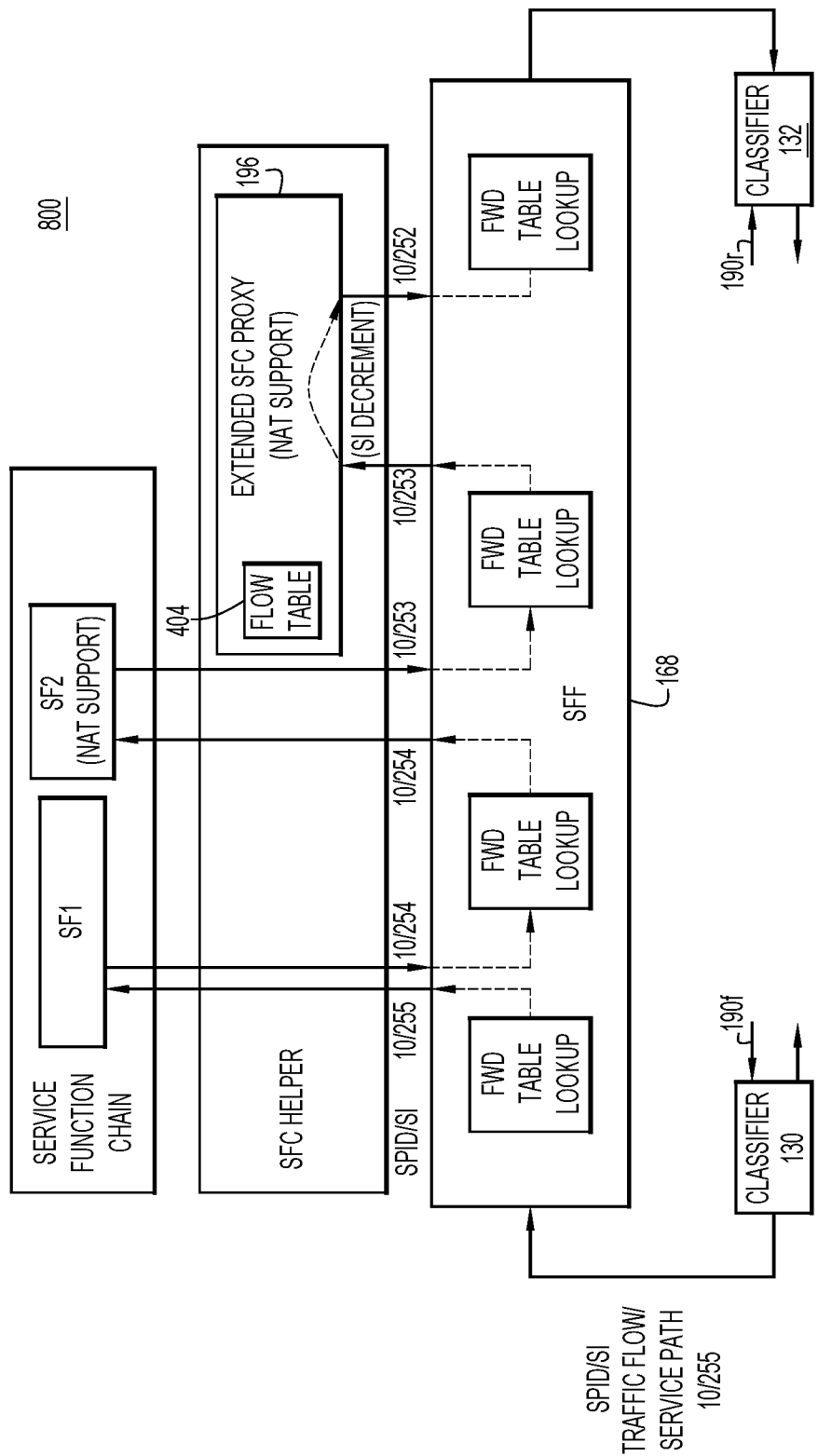
FIG. 8 is an illustration of service-function chaining using the extended SFC proxy to support a network address translation (NAT) embodiment, in accordance to an example embodiment.
Figure 9:
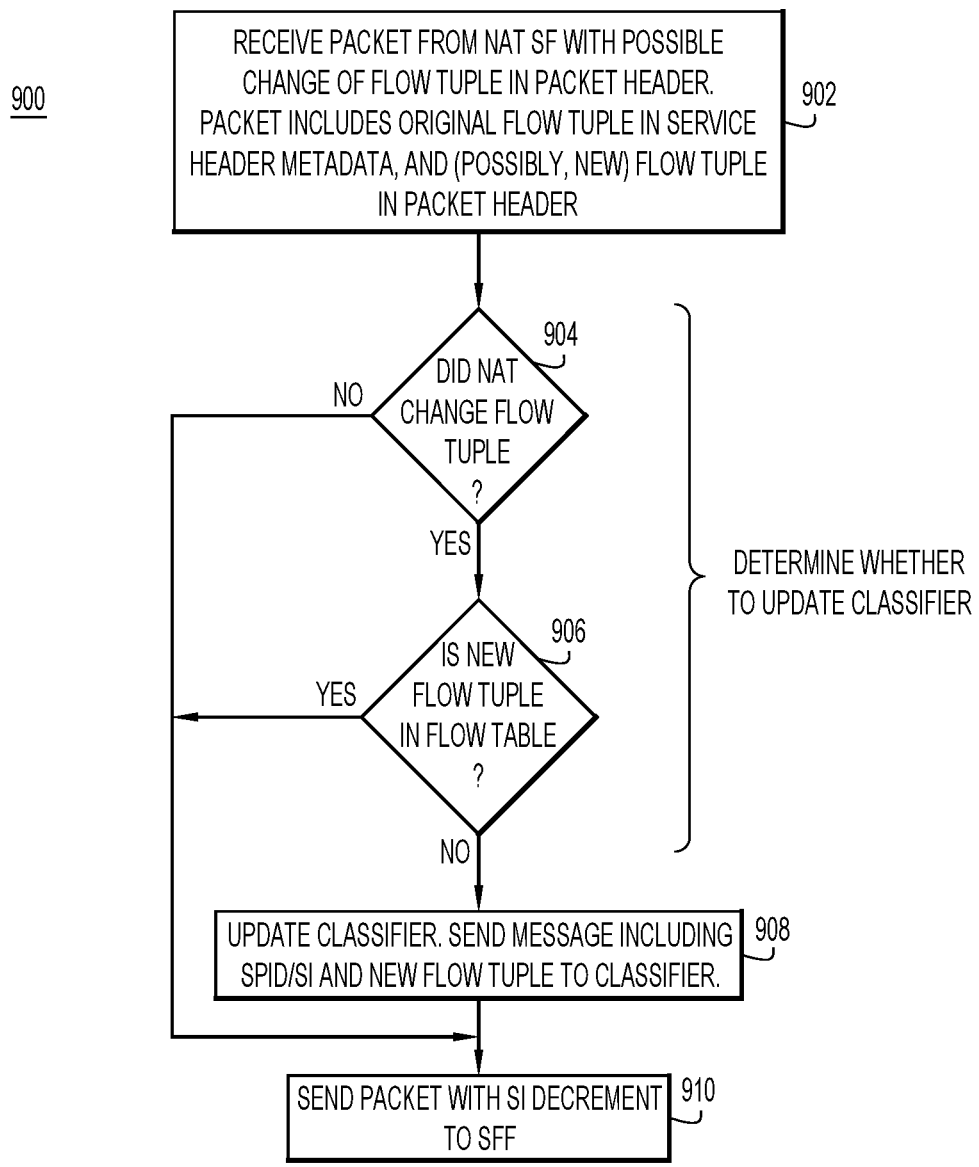
FIG. 9 is a flowchart of operations performed by the extended SFC proxy in the NAT embodiment, in accordance to an example embodiment.

With reference to FIG. 8, there is an illustration of a layered architecture 800 for service-function chaining in the NAT embodiment (d), in which extended SFC proxy 196 supports NAT/PAT performed at service-function SF2 prior to the extended SFC proxy 196 in the service path. Extended SFC proxy 196, connected in-line with SFF 168 and not directly to SF2, serves all service-functions that support NAT at a service hop. The service path implements the service-function chain defined as: SF1→SF2 (NAT/PAT operation).

Operations performed in the NAT embodiment assume extended SFC proxy 196 maintains flow table 404, as mentioned above in connection with the offload embodiment. Operations performed by SFC proxy 196 in the NAT embodiment are now described with continued reference to FIGS. 1 and 8, and also with reference to FIG. 9, which shows a flowchart 900 of the operations.

At 902, extended SFC proxy 196 receives (from SFF 168) a packet of a flow, traversing the service path in the forward direction toward classifier 132 connected to the end of the service path, from service-function SF2 that may have performed NAT on the packet, i.e., changed an original flow tuple to a new flow tuple (i.e., the current flow tuple) in the network protocol packet header. The packet also carries the original flow tuple in the metadata of the service header encapsulating the packet. The original flow tuple may have been stored in the metadata by any of the service-functions prior to extended SFC proxy, or even by classifier 130.

At 904, extended SFC proxy 196 begins the determination of whether a flow state of an egress side/port of classifier 132 needs to be updated with a new flow tuple (i.e., the current flow tuple) due to NAT performed on the flow by service-function SF2, to enable packets to traverse the service path in the reverse direction away from classifier 132, i.e., from classifier 132 to classifier 130. In other words, extended SFC proxy 196 determines whether service-function SF2 performed the NAT operation. To do this, extended SFC proxy 196 compares the original flow tuple stored in the metadata to the (possibly new) flow tuple in the network protocol packet header.

At 906, if the compare indicates that the original flow tuple in the metadata differs from the flow tuple in the network protocol packet header, i.e., that service-function SF2 performed NAT on the flow, extended SFC proxy 196 searches the flow table to determine whether the new flow tuple in the network protocol packet header exists in the flow table, i.e., was previously recorded in the flow table by the extended SFC proxy. To do this, extended SFC proxy 196 searches the flow table for an entry matching the new flow tuple.

At 908, if the search does not find the new flow tuple in the flow table, indicating that the flow does not exist, extended SFC proxy 196 sends a message including the new flow tuple (i.e., the current flow tuple in the network protocol packet header) and the service header encapsulating the packet to classifier 132. Extended SFC proxy 196 may send the message in an out-of-band channel (i.e., a communication link that is not part of the service path) to classifier 132. Responsive to receipt of the message, classifier 132 updates the egress side/port of the classifier 132 to create a flow along the service path in the reverse direction. Reverse traffic from classifier 132 passes through extended SFC proxy 196 without undergoing the operations described in this embodiment.

At 910, extended SFC proxy 196 decrements the service index in the service header and sends the packet, with the service index decremented, to SFF 168 for forwarding along the service path in the forward direction.

Figure 10:
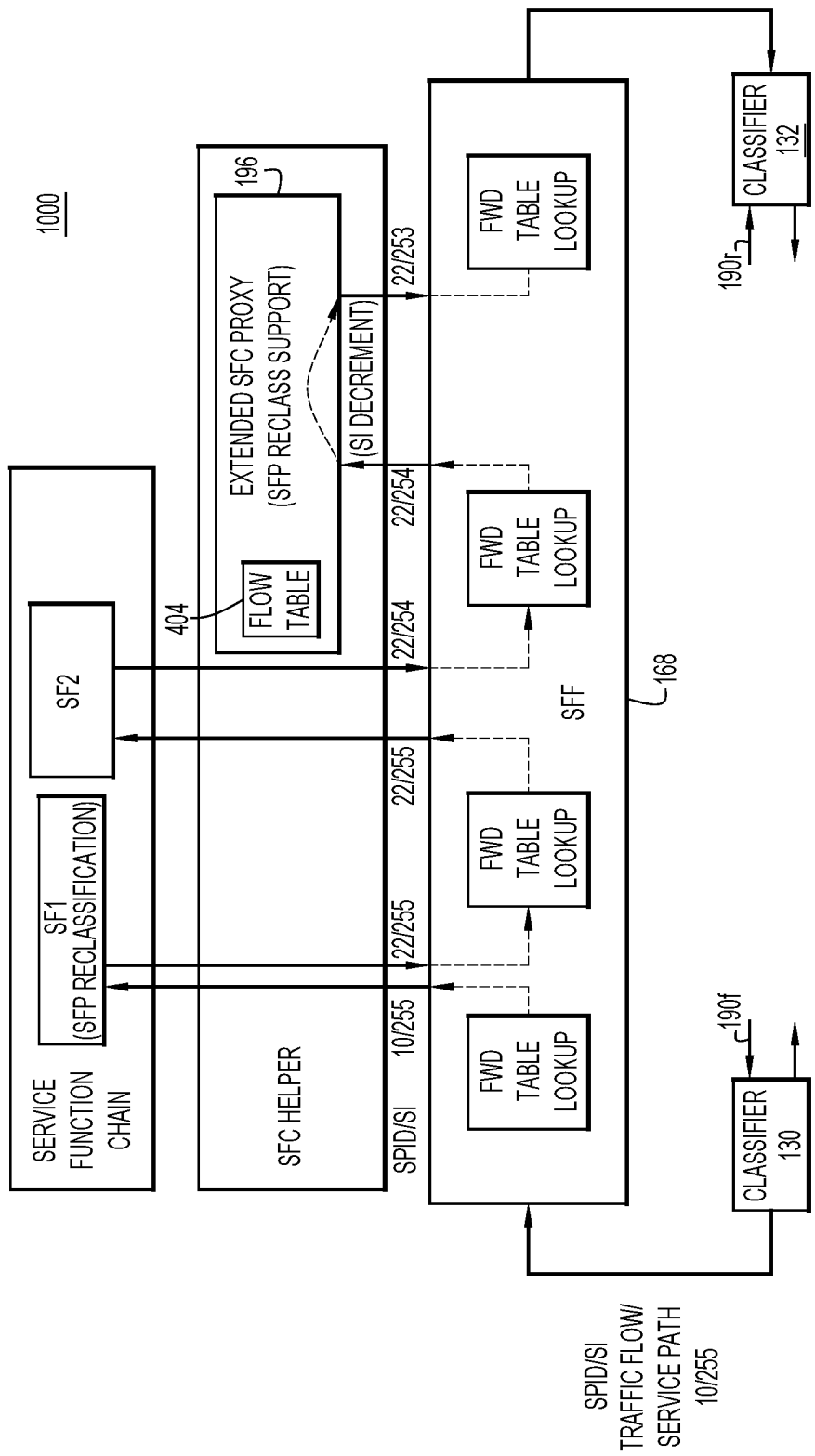
FIG. 10 is an illustration of service-function chaining using the extended SFC proxy to support a reclassification embodiment, in accordance to an example embodiment.
Figure 11:
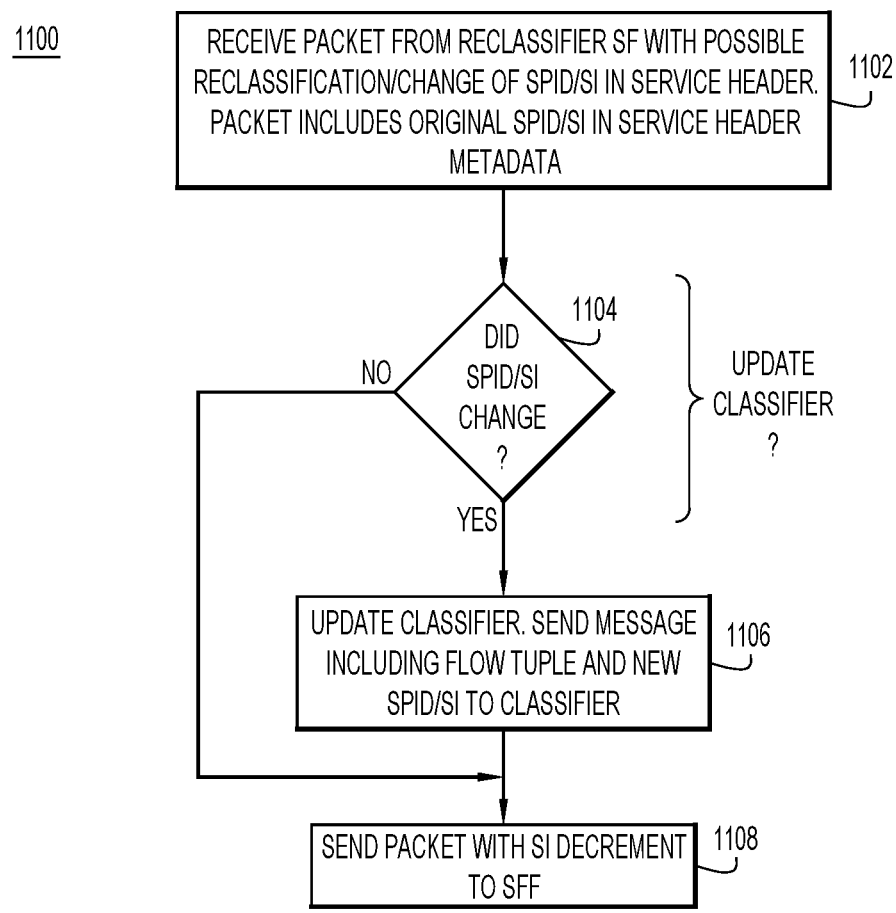
FIG. 11 is a flowchart of operations performed by the extended SFC proxy in the reclassification embodiment, in accordance to an example embodiment.

With reference to FIG. 10, there is an illustration of a layered architecture 1000 for service-function chaining in the reclassification embodiment (e), in which extended SFC proxy 196 supports reclassification on traffic performed by service-function SF1 prior to the traffic arriving at extended SFC proxy 196 in the service path. Extended SFC proxy 196, connected in-line with SFF 168 and not directly to SF1 or SF2, serves all service-functions that support reclassification at a service hop. The service path implements the service-function chain defined as: SFC: SF1 (service path reclassification)→SF2→extended SFC proxy.

Operations performed in the reclassification embodiment assume extended SFC proxy 196 maintains flow table 404. Operations performed by SFC proxy 196 in the reclassification embodiment are now described with continued reference to FIGS. 1 and 10, and also with reference to FIG. 11, which shows a flowchart 1100 of the operations.

At 1102, extended SFC proxy 196 receives (from SFF 168) a packet of a flow, traversing the service path in the forward direction toward classifier 132, from service-function SF1 that may have performed service path reclassification on the packet, i.e., changed the original SPID and SI tuple (i.e., an original classification tuple) in the service header to a new SPID and SI tuple (i.e., a new classification tuple). The packet also carries the original classification tuple in the metadata of the service header. The original classification tuple may have been stored in the metadata by any of the service-functions prior to extended SFC proxy 196, or even by classifier 130.

At 1104, extended SFC proxy 196 determines whether to update a flow state of classifier 132 with a new service path classification (i.e., service path reclassification) due to reclassification performed on the flow by service-function SF1, to enable packets to traverse the correct service path in the reverse direction from away from classifier 132 toward classifier 130. To do this, extended SFC proxy 196 compares the original classification tuple stored in the metadata to the (possibly new) classification tuple in the service header.

At 1106, if the compare indicates that the original classification tuple in the metadata differs from the current classification tuple in the service header, i.e., that service-function SF1 reclassified the flow, extended SFC proxy 196 sends a message including the new classification tuple and the flow tuple (from the packet header) to classifier 132. Extended SFC proxy 196 may send the message in an out-of-band channel. Responsive to receipt of the message, classifier 132 updates the egress side/port of the classifier 132 with the new classification tuple to create a reverse flow for the reclassified service path. Reverse traffic from classifier 132, encapsulated with a service header including the new classification tuple, passes through extended SFC proxy 196 without undergoing the operations described in this embodiment. In another embodiment, extended SFC proxy 196 may be implemented as a function on classifier 132, in which case the combined extended SFC proxy/classifier is the last service hop in the service path, and no out-of-band messaging is needed because the extended SFC proxy is internal to the classifier.

At 1108, extended SFC proxy 196 decrements the service index in the service header and sends the packet, with the service index decremented, to SFF 168 for forwarding of the packet along the service path in the forward direction.

Figure 12:
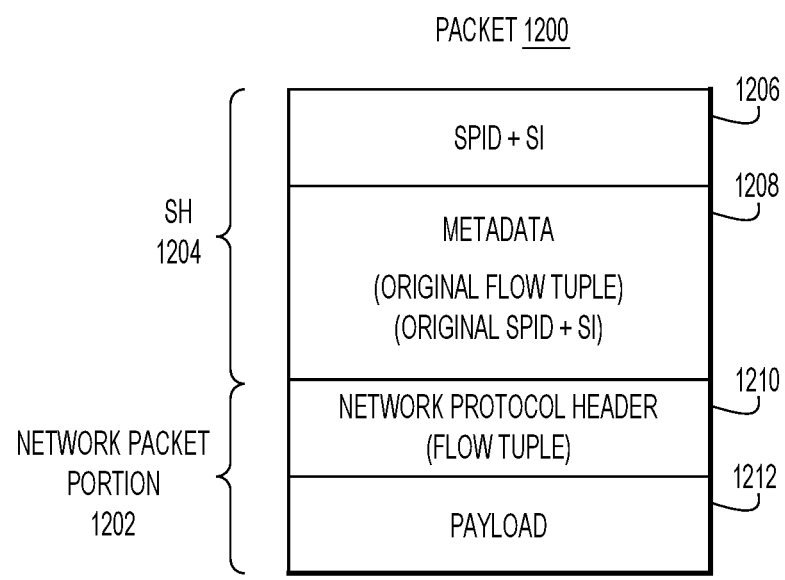
FIG. 12 is an illustration of a format of a packet traversing a service path, according to an example embodiment.

With reference to FIG. 12, there is an illustration of a format of an example packet 1200 traversing a service path. Packet 1200 includes a network packet portion 1202 encapsulated with a service header (SH) 1204. Service header 1204 includes an SPID and SI 1206 supplied by a classifier node or a reclassification service-function, and a metadata field 1208. Metadata field 1208 may carry an original flow tuple and/or an original SPID and SI, as described above. Network packet portion 1202 includes a network protocol (packet) header 1210 that carries a flow tuple (which may be changed by a NAT service-function, as described above) identifying a flow of which the packet is a part, and a payload 1212.

Figure 13:
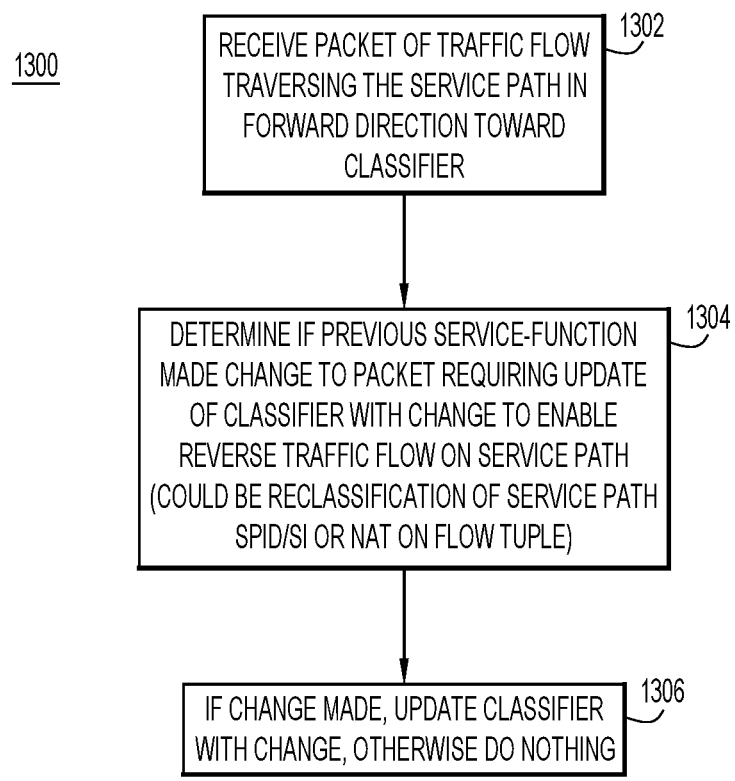
FIG. 13 is a flow chart of a high-level method combining the methods of FIGS. 9 and 11, according to an example embodiment.

With reference to FIG. 13, there is a flow chart of a high-level method 1300 combining NAT method 900 and reclassification method 1100.

At 1302, extended SFC proxy 196 receives a packet of a traffic flow traversing a service path in a forward direction toward a service-function classifier (e.g., classifier 132) connected to an end of the service path.

At 1304, extended SFC proxy 196 determines whether a prior one of the service-functions made a change to the packet requiring that the service-function classifier be updated with the change to enable a traffic flow on the service path in a reverse direction. The change could be a change to the flow tuple in the network protocol packet header due to a NAT service function or a change to the service path tuple due to a service path reclassification by a service-function. In the NAT example, extended SFC proxy 196 performs the operations in NAT method 900. In the reclassification example, extended SFC proxy 196 performs the operations in reclassification method 1100.

At 1306, if it is determined that the change was made, extended SFC proxy 196 updates the service-function classifier with the change, and otherwise does not update the service-function classifier. See operations 908 and 1106 discussed above in connection with FIGS. 9 and 11.

Figure 14:
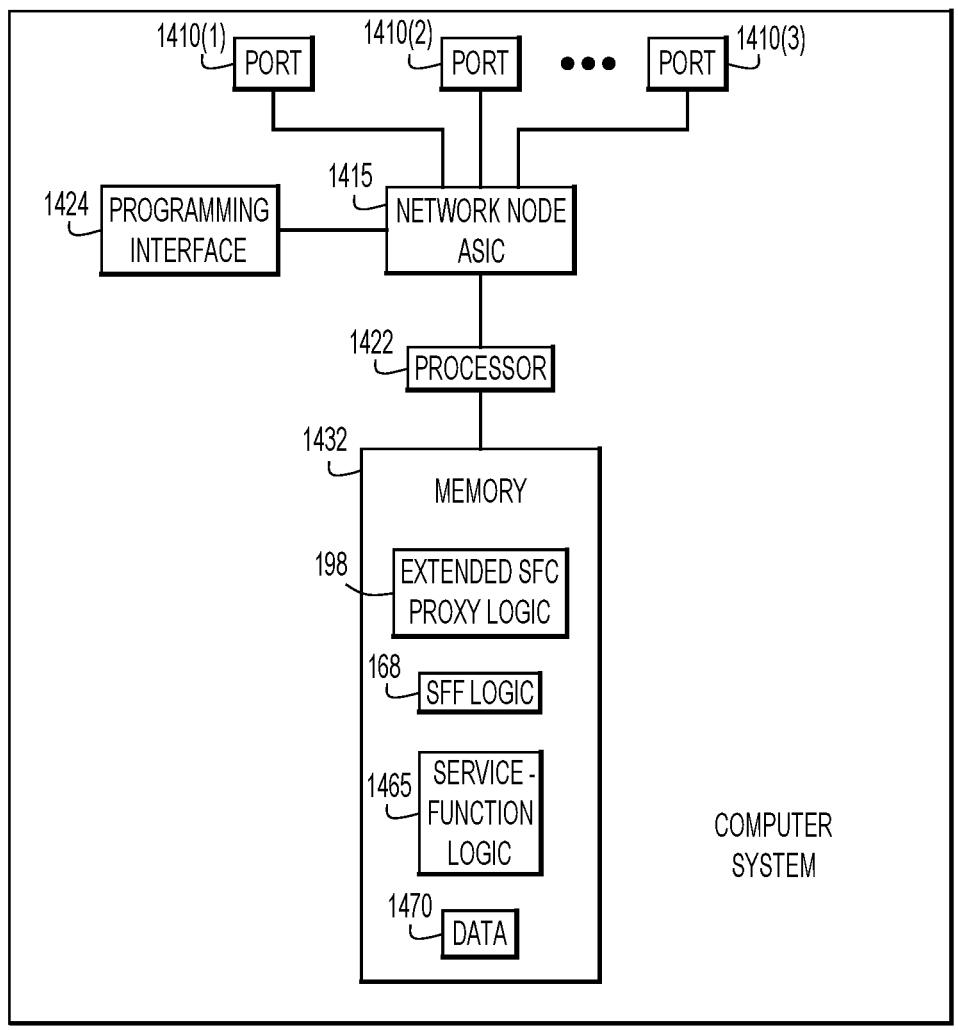
FIG. 14 is a block diagram of a computer system configured to host the extended SFC proxy, one or more service-functions in a service-function chain, and a service-function forwarder, in accordance to an example embodiment.

FIG. 14 illustrates an example block diagram of a computer system 1400, e.g., a switch, router, gateway, or any network device or node, configured to perform certain operations described herein. Computer system 1400 represents any of service nodes 135 and 140, or proxy node 194 in FIG. 1, and thus is configured to host one or more of extended SFC proxy 198, SFF 168, and/or one or more service-functions. It should be understood that a virtual network node would be a software-emulated or virtualized version of what is shown in FIG. 14. Computer system 1400 comprises a plurality of ports 1410(1)-1410(m), a programming interface 1424, a network Application Specific Integrated Circuit (ASIC) 1415, a processor or central processing unit (CPU) 1422, and memory 1432. The ports 1410(1)-1410(m) receive ingress packets and output egress packets from the network node. In certain examples, one or more of the ports 1410(1)-1410(m) are connected to one or more networks for forwarding packet data.

The network node ASIC 1415 directs incoming packets to ports for egress according to logic as well as controls from the processor 1422. For example, if the network node is a router, then the ASIC 1415 is a router ASIC configured for network routing functions, and if the network node is a switch, then the ASIC 1415 is a switch ASIC configured for network switch functions. The processor 1422 is a microprocessor or microcontroller, for example, and executes instructions for extended SFC proxy logic 198, SFF logic 168, and/or service-function logic 1465 (e.g., any of service-functions $f_1$-$f_7$, SF1, SF2, and SF3) stored in memory 1432. The logic 198, 168, and 1465 each includes instructions that, when executed by the processor 1422, cause the processor to perform the operations described herein with reference to the extended SFC proxy (e.g., as described in connection with FIGS. 2-11), the SFF, and the service-functions.

The memory 1432 may include read only memory (ROM), random access memory (RAM), magnetic disk storage media devices, optical storage media devices, flash memory devices, electrical, optical, or other physical/tangible memory storage devices. In general, the memory 1432 may comprise one or more tangible (non-transitory) computer readable storage media (e.g., a memory device) encoded with software comprising computer executable instructions and when the software is executed (by the processor 1422) it is operable to perform the operations described herein.

Memory 1432 also stores data 1470 used and generated by logic 198, 168, and 1465.

In summary, the extended SFC proxy performs the following new functions compared to the conventional proxy defined in RFC 7665: performing packet replication as needed; preserving the service header for the associated service-function (i.e., the service-function behind the extended SFC proxy; maintaining flow states for stateful service-functions and associated service-function instances; maintaining flow stickiness to the service-function instances; creating an offloading flow entry based on demand from a service-function; examining packets against flow states to determine local forwarding (offloading) or passing to the associated service-function; not decrementing the service index when sending a packet to a service-function and that was received from the SFF or forwarding packet from the service-function to return the packet to SFF; decrementing the service index when forwarding a packet to the SFF after receiving the packet from the SFF (i.e. similar to a service-function operation); updating flow state with a new service-path on behalf of a service-function classifier for service path reclassification; updating flow state with a flow tuple that resulted from NAT on behalf of the service-function classifier for NAT/PAT operation; serving the service-function and SFF components in a service-function chain and not directly providing a service on the user traffic (which is served by the service-functions in the service chain); is invisible in the service-function chain (from user perspective); and is visible as a service-function hop in the service path (from the SFF perspective).

The extended SFC Proxy facilitates the service-functions with special requirements to interact with the SFF in compliance with defined service-function chain architecture. For a receive-only service-function, an advantage is that the receive-only service-function is in the service-function chain, simplifying service chaining policy. A single service-function chain policy is used to manage service-paths regardless of whether they return packets. For flow offload, an advantage is to maintain simplicity of the SFF and allow offloading to be performed gracefully with high efficiency. For load balancing service-path instances, an advantage is that the SPID space does not need to be expanded to account for the service-path instances. That is, the clustered service-path is listed in the service path instead of individual service-path instances. For NAT/PAT operation, an advantage is to be able to classify the reverse traffic using the flow tuple that underwent NAT/PAT. For service path reclassification, an advantage is to be able to classify subsequent traffic on both the forward and the reverse flow after the service path is changed.

Summaries of the receive-only, offload, load balance, NAT, reclassification, and combined NAT/reclassification embodiments are provided below. Each embodiment may be implemented in the form of a method, an apparatus, and a computer readable medium.

1. Receive-Only Embodiment

A method according to a receive-only embodiment comprises: at an extended service-function proxy hosted on a network node and connected to a service path formed by one or more network nodes hosting a chain of service-functions applied to packets traversing the service path, wherein the packets each include a service header having a service path identifier and a service index decremented by each service-function when applied: receiving from the service path a packet destined for a receive-only service-function among the service-functions and, upon receiving the packet: replicating the packet and sending the replicated packet to the receive-only service-function without decrementing the service index in the replicated packet; and decrementing the service index in the packet and forwarding the packet along the service path.

In the method, the sending may include sending the replicated packet without removing the service header from the replicated packet.

In the method:
a. the extended SFC proxy is connected between the receive-only service-function and a service-function forwarder hosted on one or more network nodes and configured to deliver and receive the packets to and from the service-functions;
b. the receiving includes receiving the packet from the service-function forwarder; and
c. the forwarding includes sending the packet to the service-function forwarder.

An apparatus according to a receive-only embodiment comprises: a network interface unit; and a processor coupled to the network interface unit and configured to implement an extended SFC proxy that is configured to perform the operations of the method according to the receive-only embodiment.

A non-transitory computer readable storage medium according to a receive-only embodiment is encoded instructions that, when executed by a processor, cause the processor to implement an extended SFC proxy that is configured to perform the operations of the method according to the receive-only embodiment.

2. Offload Embodiment

A method according to an offload embodiment comprises: at an extended service-function chain (SFC) proxy hosted on a network node and connected to a service path formed by one or more network nodes hosting a chain of service-functions applied to packets traversing the service path, wherein the packets each include a service header having a service path identifier and a service index: receiving from the service path a packet of a traffic flow destined for a service-function among the service-functions, and sending the packet to the service-function; receiving from the service-function an indication to offload the traffic flow; storing the indication in a flow table having entries each identifying a respective traffic flow handled by the extended SFC proxy; receiving from the service path a subsequent packet of the traffic flow; searching the flow table for the indication to offload the traffic flow; and upon finding the indication, bypassing the service-function, and forwarding the subsequent packet along the service path.

An apparatus according to an offload embodiment comprises: a network interface unit to send and receive packets to and from a network; a processor configured to connect, via the network interface unit, with a service path formed by one or more network nodes hosting a chain of service-functions applied to the packets traversing the service path, wherein the packets each include a service header having a service path identifier and a service index, wherein the processor is further configured to: receive from the service path a packet of a traffic flow destined for a service-function among the service-functions, and send the packet to the service-function; receive from the service-function an indication to offload the traffic flow; store the indication in a flow table having entries each identifying a respective traffic flow handled by the processor; receive from the service path a subsequent packet of the traffic flow; search the flow table for the indication to offload the traffic flow; and upon finding the indication, bypass the service-function, and forward the subsequent packet along the service path.

A non-transitory computer readable storage medium according to an offload embodiment is encoded with instructions that, when executed by a processor of a network node connected to a service path formed by one or more network nodes hosting a chain of service-functions applied to packets traversing the service path, wherein the packets each include a service header having a service path identifier and a service index, cause the processor to perform: receiving from the service path a packet of a traffic flow destined for a service-function among the service-functions, and sending the packet to the service-function; receiving from the service-function an indication to offload the traffic flow; storing the indication in a flow table having entries each identifying a respective traffic flow handled by the processor; receiving from the service path a subsequent packet of the traffic flow; searching the flow table for the indication to offload the traffic flow; and upon finding the indication, bypassing the service-function, and forwarding the subsequent packet along the service path.

3. Load Balance Embodiment

A method according to a load balance embodiment comprises: at an extended service-function chain (SFC) proxy hosted on a network node and connected to a service path formed by one or more network nodes hosting a chain of service-functions applied to packets traversing the service path, wherein the packets each include a service header having a service path identifier: receiving from the service path a packet of a traffic flow destined for a service-function among the service-functions; selecting, among multiple stateful instances of the service-function, a selected instance to serve the traffic flow based on a load balancing criterion; storing in a load balance table an indicator of the selected instance; sending the packet to the selected instance; receiving from the service path a subsequent packet of the traffic flow destined for the service-function; searching the load balance table for the indicator of the selected instance; and upon finding the indicator of the selected instance, sending the subsequent packet to the selected instance.

The method further comprises receiving from the selected instance processed versions of the packet and the subsequent packet, and forwarding the processed versions of the packet and the subsequent packet along the service path without adding a service header to either the packet or the subsequent packet.

In the method:
a. the extended SFC proxy is connected between the selected instance of the service-function and a service-function forwarder hosted on one or more network nodes and configured to deliver and receive the packets to and from the service-functions;
b. the receiving the packet and the receiving the subsequent packet each includes receiving the respective packet from the service-function forwarder; and
c. the forwarding the processed versions includes sending the processed versions of the packet and the subsequent packet to the service-function forwarder.

In the method, the sending the packet and the sending the subsequent packet to the selected instance each includes sending the respective packet without removing the service header from the packet.

In the method:
a. the load balance table includes entries each identifying a respective traffic flow handled by the extended SFC proxy and including an associated indicator, if any, of a selected instance to serve the identified traffic flow; and
b. the storing includes storing the indicator in an entry of the load balance table identifying the traffic flow.

An apparatus according to a load balance embodiment comprises: a network interface unit; and a processor coupled to the network interface unit and configured to implement an extended SFC proxy that is configured to perform the operations of the method according to the load balance embodiment.

A non-transitory computer readable storage medium according to a load balance embodiment is encoded with instructions that, when executed by a processor, cause the processor to implement an extended SFC proxy that is configured to perform the operations of the method according to the load balance embodiment.

4. NAT Embodiment

A method according a NAT embodiment comprises: at an extended service-function (SFC) proxy hosted on a network node and connected to a service path formed by network nodes hosting a chain of service-functions applied to packets traversing the service path, each packet encapsulated by a service header including a service path identifier and a service index: receiving a packet of a traffic flow traversing the service path in a forward direction toward a service-function classifier connected to an end of the service path; first determining whether network address translation by one of the service functions changed a flow tuple of the packet identifying the traffic flow; if network address translation changed the flow tuple, second determining whether to update the service-function classifier with the flow tuple; and if it is determined to update, updating the service-function classifier with the flow tuple to enable a flow on the service path in a reverse direction.

The method further comprises: if it is determined not to update, not updating the service-function classifier.

In the method, the updating includes sending to the service-function classifier via a communication channel an update message including the flow tuple and the service-path identifier.

The method further comprises:
a. decrementing the service index in the service header of the packet and forwarding the packet along the service path without removing the service header or adding a service header.

In the method:
a. the extended SFC proxy is connected to a service-function forwarder hosted on one or more network nodes and configured to deliver and receive the packets to and from the service-functions;
b. the receiving includes receiving the packet from the service-function forwarder; and c. the forwarding includes sending the packet to the service-function forwarder.

In the method:
a. the receiving includes receiving the packet with an original flow tuple carried in metadata of the service header and the flow tuple carried in a network protocol header of the packet;
b. the first determining includes determining whether the original flow tuple in the metadata differs from the flow tuple in the network protocol header;
c. if the original flow tuple in the metadata differs from the flow tuple in the network protocol header, declaring that the network address translation changed the flow tuple, otherwise declaring that the network address translation did not change the flow tuple.

In the method, the second determining includes:
a. searching a flow table, including flow tuples each identifying a respective traffic flow seen by the extended SFC proxy, for a flow tuple that matches the flow tuple; and
b. if the searching does not find a match or finds a match, performing the updating or not performing the updating, respectively.

An apparatus according a NAT embodiment comprises: a network interface unit; and a processor coupled to the network interface unit and configured to implement an extended SFC proxy that is configured to perform the operations of the method according to the NAT embodiment.

A non-transitory computer readable storage medium according a NAT embodiment is encoded with instructions that, when executed by a processor, cause the processor to implement an extended SFC proxy that is configured to perform the operations of the method according to the NAT embodiment.

5. Reclassification Embodiment

A method according to a reclassification embodiment comprises: at an extended service-function (SFC) proxy hosted on a network node and connected to a service path formed by network nodes hosting a chain of service-functions applied to packets traversing the service path, each packet including a service header with a service path tuple including a service path identifier and a service index: receiving a packet of a traffic flow traversing the service path in a forward direction toward a service-function classifier connected to an end of the service path; determining whether reclassification by one of the service-functions changed the service path tuple in the service header; and if reclassification changed the service path tuple, updating the service-function classifier with the service path tuple to enable a flow on a corresponding new service path in a reverse direction.

The method further comprises: if reclassification did not change the service path tuple, not updating the service-function classifier.

In the method:
a. the receiving includes receiving the packet such that service header includes the service path tuple and metadata in which an original service path tuple is carried;
b. the determining includes determining whether the service path tuple matches the original service path tuple carried in the metadata;
c. if the service path tuple does not match the original service path tuple carried in the metadata, declaring that the reclassification changed the original service path tuple to the service path tuple, otherwise declaring that reclassification did not occur.

The method further comprises forwarding the packet along the service path in accordance with the service path tuple.

In the method, the updating includes sending to the service-function classifier via a communication channel an update message including the service path tuple and a flow tuple from the packet identifying the traffic flow.

An apparatus according to a reclassification embodiment comprises: a network interface unit; and a processor coupled to the network interface unit and configured to implement an extended SFC proxy that is configured to perform the operations of the method according to the reclassification embodiment.

A non-transitory computer readable storage medium according to a reclassification embodiment is encoded with instructions that, when executed by a processor, cause the processor to implement an extended SFC proxy that is configured to perform the operations of the method according to the reclassification embodiment.

6. Combined NAT/Reclassification Embodiment

A method according to a combined NAT/reclassification embodiment comprises: at an extended service-function (SFC) proxy hosted on a network node and connected to a service path formed by network nodes hosting a chain of service-functions applied to packets traversing the service path, each packet including a service header with a service path tuple including a service path identifier and a service index: receiving a packet of a traffic flow traversing the service path in a forward direction toward a service-function classifier connected to an end of the service path; determining whether one of the service-functions made a change to the packet requiring that the service-function classifier be updated with the change to enable a traffic flow on the service path in a reverse direction; and if it is determined that the change was made, updating the service-function classifier with the change, and otherwise not updating the service-function classifier.

In the method, the determining includes:
a. determining whether network address translation by the one of the service functions changed a flow tuple in the packet that identifies the traffic flow;
b. if it is determined that the network address translation changed the flow tuple, determining whether to update the service-function classifier with the flow tuple; and
c. if it is determined to update the service-function classifier with the flow tuple, updating the service-function with the flow tuple.

In the method:
a. the receiving includes receiving the packet with an original flow tuple carried in metadata of the service header and the flow tuple carried in a network protocol header of the packet; and
b. the determining whether the network address translation changed the flow tuple includes:
   i. determining whether the original flow tuple in the metadata differs from the flow tuple in the network protocol header; and
   ii. if the original flow tuple in the metadata differs from the flow tuple in the network protocol header, declaring that the network address translation changed the flow tuple, otherwise declaring that the network address translation did not change the flow tuple.

In the method, the determining whether to update the service-function classifier with the flow tuple includes:
a. searching a flow table, including flow tuples each identifying a respective traffic flow seen by the extended SFC proxy node, for a flow tuple that matches the flow tuple; and
b. if the searching does not find a match or finds a match, determining to perform the update or determining not to perform the update, respectively.

In the method, the determining includes:
a. determining whether reclassification by the service-functions changed the service path tuple in the service header; and
b. it is determined that reclassification changed the service path tuple, determining to update the service-function classifier with the service path tuple.

In the method:
a. the receiving includes receiving the packet such that service header includes the service path tuple and metadata in which an original service path tuple is carried;
b. the determining further includes determining whether the service path tuple matches the original service path tuple carried in the metadata; and
c. if the service path tuple does not match the original service path tuple carried in the metadata, declaring that the reclassification changed the original service path tuple to the service path tuple, otherwise declaring that reclassification did not occur.

In the method, the determining includes determining whether one of the service-functions either reclassified the service path causing a change of the service path tuple or performed network address translation on the packet causing a change to a flow tuple in the packet.

In the method, the determining includes:
a. determining whether the service path tuple in the service header differs from an original service path tuple carried in metadata of the service header because of reclassification of the service path by the one of the service-functions; and
b. if the service path tuples differ, declaring that the change was made.

In the method, the determining includes:
a. determining whether a flow tuple in a network protocol header of the packet differs from an original flow tuple carried in metadata of the service header because of network address translation performed by the one of the service-functions; and
b. if the flow tuples differ, declaring that the change was made.

An apparatus according to a combined NAT/reclassification embodiment comprises: a network interface unit; and a processor coupled to the network interface unit and configured to implement an extended SFC proxy that is configured to perform the operations of the method according to the combined NAT/reclassification embodiment.

A non-transitory computer readable storage medium according to a combined NAT/reclassification embodiment is encoded with instructions that, when executed by a processor, cause the processor to implement an extended SFC proxy that is configured to perform the operations of the method according to the combined NAT/reclassification embodiment.

The above description is intended by way of example only. Various modifications and structural changes may be made therein without departing from the scope of the concepts described herein and within the scope and range of equivalents of the claims.

What is claimed is:

1. A method comprising:
at an extended service-function chain (SFC) proxy hosted on a network node and connected to a service path hosting a chain of service-functions that are applied to packets traversing the service path, wherein the packets each includes a service header having a service path identifier and a service index:
receiving a packet of a traffic flow traversing the service path in a forward direction toward a service-function classifier connected to an end of the service path;
first determining whether network address translation by one of the service-functions changed a flow tuple of the packet identifying the traffic flow;
when the network address translation changed the flow tuple, second determining whether to update the service-function classifier with the flow tuple; and
when it is determined to update, updating the service-function classifier by sending to the service-function classifier, via a communication channel, an update message including the flow tuple and the service path identifier to enable a flow on the service path in a reverse direction.

2. The method of claim 1, further comprising:
when it is determined not to update, not updating the service-function classifier.

3. The method of claim 1, wherein the network node includes a router.

4. The method of claim 1, further comprising:
decrementing the service index in the service header of the packet and forwarding the packet along the service path without removing the service header or adding a service header.

5. The method of claim 1, wherein:
the receiving includes receiving the packet with the flow tuple carried in a network protocol header of the packet, and an original flow tuple carried in metadata of the service header;
the first determining includes determining whether the flow tuple in the network protocol header differs from the original flow tuple in the metadata; and
the method further comprises, when the flow tuple differs from the original flow tuple, declaring that the network address translation changed the flow tuple.

6. The method of claim 1, wherein:
the second determining includes searching a flow table, including flow tuples each identifying a respective traffic flow seen by the extended SFC proxy, for one of the flow tuples in the flow table that matches the flow tuple; and
the method further comprises, when the searching does not find a match, performing the updating.

7. The method of claim 6, further comprising:
when the searching finds a match, not performing the updating.

8. The method of claim 1, wherein:
the extended SFC proxy is connected in-line with a service-function forwarder hosted on one or more network nodes and configured to deliver and receive the packets to and from the service-functions, and the extended SFC proxy is not connected directly to any of the service-functions.

9. An apparatus comprising:
a network interface unit to send and receive packets to and from a network; and
a processor of a network node configured to connect to a service path hosting a chain of service-functions that are applied to packets traversing the service path, wherein the packets each includes a service header having a service path identifier and a service index, wherein the processor is configured to perform operations including:
receiving a packet of a traffic flow traversing the service path in a forward direction toward a service-function classifier connected to an end of the service path;
first determining whether network address translation by one of the service-functions changed a flow tuple of the packet identifying the traffic flow;
when the network address translation changed the flow tuple, second determining whether to update the service-function classifier with the flow tuple by searching a flow table, including flow tuples each identifying a respective traffic flow that has been seen, for one of the flow tuples in the flow table that matches the flow tuple; and
when it is determined to update because searching does not find a match, updating the service-function classifier with the flow tuple to enable a flow on the service path in a reverse direction.

10. The apparatus of claim 9, wherein the processor is further configured to perform:
when it is determined not to update, not updating the service-function classifier.

11. The apparatus of claim 9, wherein the processor is configured to perform the updating by:
sending to the service-function classifier, via a communication channel, an update message including the flow tuple and the service path identifier.

12. The apparatus of claim 9, wherein the processor is further configured to perform:
decrementing the service index in the service header of the packet and forwarding the packet along the service path without removing the service header or adding a service header.

13. The apparatus of claim 9, wherein the processor is configured to:
perform the receiving by receiving the packet with the flow tuple carried in a network protocol header of the packet, and an original flow tuple carried in metadata of the service header;
perform the first determining by determining whether the flow tuple in the network protocol header differs from the original flow tuple in the metadata; and
when the flow tuple differs from the original flow tuple, declare that the network address translation changed the flow tuple.

14. The apparatus of claim 9, wherein network node includes a router.

15. The apparatus of claim 9, wherein the processor is further configured to perform:
when the searching finds a match, not performing the updating.

16. A non-transitory computer readable storage medium encoded with instructions that, when executed by a processor of a network node connected to a service path hosting a chain of service-functions that are applied to packets traversing the service path, wherein the packets each includes a service header having a service path identifier a service index, and metadata that carries an original flow tuple, cause the processor to perform operations including:
receiving a packet of a traffic flow traversing the service path in a forward direction toward a service-function classifier connected to an end of the service path;
first determining whether network address translation by one of the service-functions changed a flow tuple that is carried in a network protocol header of the packet and identifies the traffic flow;
when the network address translation changed the flow tuple, second determining whether to update the service-function classifier with the flow tuple by determining whether the flow tuple differs from the original flow tuple and, when the flow tuple differs from the original flow tuple, declaring that the network address translation changed the flow tuple; and
when it is determined to update, updating the service-function classifier with the flow tuple to enable a flow on the service path in a reverse direction.

17. The non-transitory computer readable storage medium of claim 16, further comprising instructions to cause the processor to perform:
when it is determined not to update, not updating the service-function classifier.

18. The non-transitory computer readable storage medium of claim 16, wherein:
the instructions to cause the processor to perform the updating include instructions to cause the processor to perform sending to the service-function classifier, via a communication channel, an update message including the flow tuple and the service path identifier.

19. The non-transitory computer readable storage medium of claim 16, further comprising instructions to cause the processor to perform:
decrementing the service index in the service header of the packet and forwarding the packet along the service path without removing the service header or adding a service header.

20. The non-transitory computer readable storage medium of claim 16, wherein the network node includes a router.

* * * * *